United States Patent [19]

Smith et al.

[11] Patent Number: 5,046,024

[45] Date of Patent: Sep. 3, 1991

[54] VECTOR CALCULATOR APPARATUS FOR GRAPHIC WAVEFORM MANIPULATION

[75] Inventors: David W. Smith, Forest Grove; Scott A. Majdecki, Newberg, both of Oreg.

[73] Assignee: Analogy, Inc., Beaverton, Oreg.

[21] Appl. No.: 19,418

[22] Filed: Feb. 26, 1987

[51] Int. Cl.$^5$ .............................................. G06F 15/20
[52] U.S. Cl. ..................................... 364/518; 364/736
[58] Field of Search .............................. 364/518–521, 364/709.01, 710.01, 709.14, 710.08, 715.03, 736; 340/710, 712, 734

[56] References Cited

U.S. PATENT DOCUMENTS

| | | | |
|---|---|---|---|
| 4,581,761 | 4/1986 | Ichinokawa et al. | 340/710 X |
| 4,656,603 | 4/1987 | Dunn | 364/521 X |
| 4,698,626 | 10/1987 | Sato et al. | 340/710 |
| 4,725,694 | 2/1988 | Auer et al. | 340/712 X |
| 4,803,463 | 2/1989 | Sado | 364/709.14 |
| 4,866,650 | 9/1989 | Oba et al. | 364/736 |

OTHER PUBLICATIONS

*Personal Programming*, pp. II-14–II-15, 1977, 1979.

*Primary Examiner*—Heather R. Herndon
*Attorney, Agent, or Firm*—Kolisch, Hartwell, Dickinson, McCormack & Heuser

[57] ABSTRACT

A software system that simulates the appearance and operation of a calculator provides a user interface to graphic waveform data base manipulation software. The calculator includes a plural key calculator pad, with the keys in the pad being associable in the system with different vector operators. It also includes a subwindow area in which the symbolically encoded operands and operators that form the expression to be evaluated are maintained for viewing by the user. The calculator's keys, which may be operated by conventional cursor control means, are labeled with a descriptive legend representing the currently assigned vector operator. A post-fix operand entry protocol resembling that used in conventional scientific calculators is enforced for keypad input, while in-fix notation is used in the subwindow's representation of the expression to be evaluated. The calculator may be used, in conjunction with an interactive simulator, to facilitate the user interface to graphic waveform manipulation software.

10 Claims, 2 Drawing Sheets

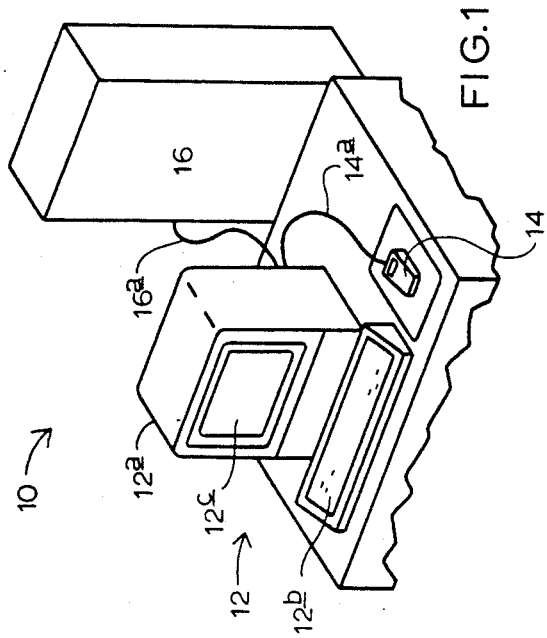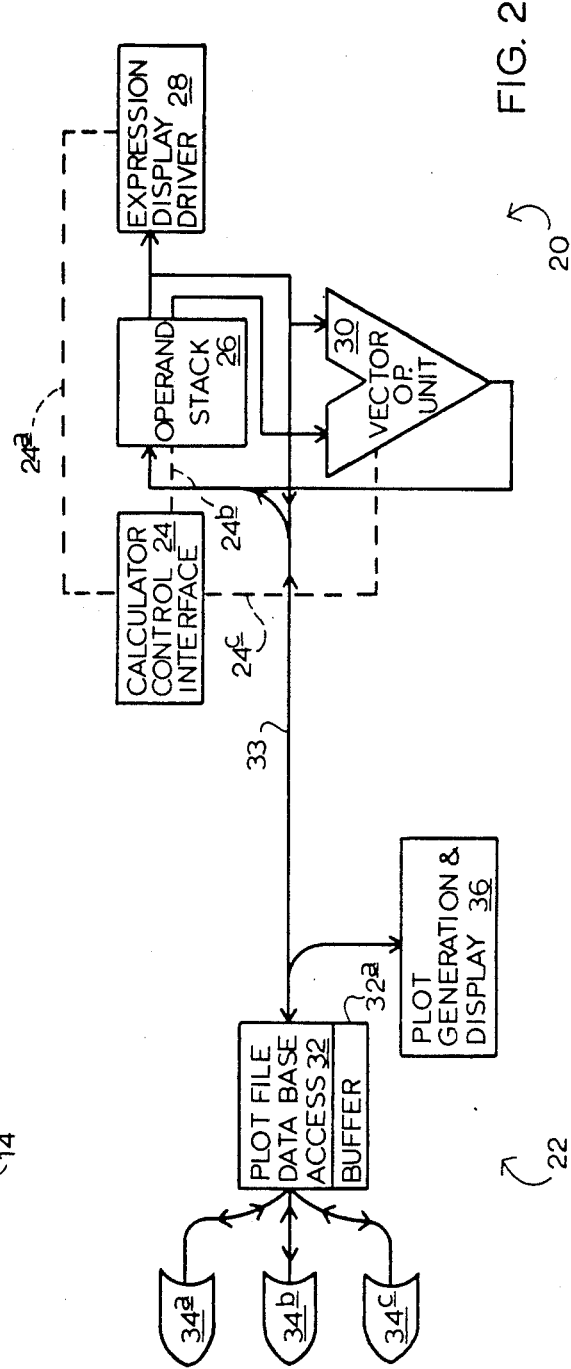

VECTOR CALCULATOR APPARATUS FOR GRAPHIC WAVEFORM MANIPULATION

BACKGROUND AND SUMMARY OF THE INVENTION

This invention relates generally to user interfaces to terminal-based computer systems capable of processing vector data, and more particularly to software for simulating the appearance and operation of a calculator-like vector manipulator. A preferred embodiment of the invention is described in conjunction with retrieving, manipulating, displaying and storing user-selectable graphic waveform data produced by analog circuit simulation.

Interfaces to terminal-based computer systems have become, in the past few years, increasingly user-friendly. The advent of display windows, each representing a concurrently executing task and each being concurrently operable by the terminal's user, has made it possible to simulate, for display on the terminal's display monitor, a user's physical work space (the simulation being referred to as a desktop). Such features as time-of-day clocks, scratchpads, file organizers and wastebaskets have been provided in graphic or icon form to facilitate desktop organization and management without resort to arcane, textual command entry. Cursor control systems also have become more user-friendly. They almost invariably provide what is known as a "mouse" to enable the terminal's user to locate a cursor within the monitor's display field and, with the depression of a pushbutton, to designate a particular location therein. The marriage of these two concepts has reduced drastically the number of keystrokes required to enter a command, and has provided a pictorial, rather than syntactical, approach to interfacing computers and their users, whose creative processes tend to be more symbolic than expressive.

With the benefit of user-friendly software, a user may easily "grasp" any of the software tools mentioned above by selecting the icon associated therewith. For example, the time-of-day clock may be displayed in digital or analog format when the user is performing a time-critical task and perpetually needs to know what time it is. An outdated or unneeded file may be discarded in the wastebasket and disk space may be reclaimed thereby. The user may make a note on the scratchpad. The icon-covered desktop may be organized to make it easier to find a file, note or tool. All of these operations may be accomplished, without resort to typed commands, by simply locating the cursor near the icon symbolizing the desired tool and "clicking" the mouse's pushbutton.

Calculators have been known to be included in the software toolkits of such user-friendly systems. It was thought that the calculator was a tool needed frequently by users to add or multiply two numbers, or to subtract one from, or divide one by, another. By selecting a calculator icon, the user of the terminal obtained access to a simulated calculator display window that could be moved around the desktop, or put away, when not needed, as with other tools. Calculator displays were formatted to look like many of the popular calculators of the day, i.e, they had keys representing the numerals 0 through 9; function keys, e.g. +, −, ×, ÷, =; and a display that, responsive to the user's inputs, symbolically represented selected operators, operands and calculation results.

Engineers will not be unaffected by the user interface revolution. Computer aided engineering, including design and manufacturing, currently is among the most rapidly developing technical fields. Electrical engineers design and simulate digital and analog circuits and systems; mechanical engineers develop circuit boards, connectors, cables and enclosures; manufacturing engineers draft and specify packaging materials in which to ship the products designed by others. All make extensive use of computers, usually networked together so that specifications and drawings may be conveyed among participating design groups electronically. Thus, user-friendly interfaces will find their way into even the sophisticated users' hands.

In the electrical engineering discipline, application programs called simulators allow a design engineer to describe a complex analog circuit by creating a new library, or augmenting an existing library, of models that describe various circuit elements, e.g. resistors, capacitors and transistors. An elemental model typically includes a complete characterization of a circuit element, including the relationship among voltage, current and, e.g. resistance (in the case of a resistor). When the engineer wants to employ the models in a circuit simulation, the circuit is first defined by logically interconnecting various elements. Next, constant values, e.g. the values of the resistors, capacitors and transistors defining the circuit, are assigned. Finally, initial conditions are specified and the simulator is commanded to run. The results of the simulation usually include certain limited characteristics of the circuit described by the engineer, including, for example, the instantaneous voltage at any given node. Display processors make it possible to view the circuit's response to chosen stimuli, in the form of a graphic waveform.

Analog circuit design is an iterative process. Therefore, the results of such a simulation might be fed back into the engineer's definition of the analog circuit. For example, a bias resistor may be added, or its value changed, and then the simulation may be rerun to verify the modified circuit definition. By this often tedious process, the engineer ultimately achieves simulated circuit response characteristics that meet particular performance specifications, without resort to a hard-wired "breadboard" and prototype implementation. Although simulation is a time-saver, it is also costly, as multiple simulation runs are central processing unit (CPU)- and memory-intensive alternatives to breadboarding and prototyping.

Graphic waveform data manipulation is a less expensive and time-consuming proposition, as it enables the engineer to manipulate post-simulation results without resort to another, relatively expensive simulation run. Such manipulations might involve multiple dependent variables, e.g. current and voltage, as a function of time. Manipulations involving a single variable as a function of time, or a single variable and a scalar quantity, also may be performed by such software. Means to perform such graphic waveform manipulations on a "soft" calculator, or a calculator simulator (referred to hereinafter as, simply, a calculator), that is available as a desktop tool on a computer terminal, has not been provided heretofore.

It is a principal object of the invention to provide a vector data manipulation system that simulates the appearance and operation of a calculator whose operands are vectors.

Another important object of the invention is to provide such a system that is compatible with existing vector processing application software.

It is yet a further object of the invention to provide such a system in a display format that is convenient to use, and familiar to users of existing scientific calculators.

According to a preferred embodiment of the invention, display and program means are provided for simulating the appearance and operation of a plural key calculator pad having a display area. The calculator's keypad is operable to select operators using a conventional cursor control system, and the calculator's keypad and display are visible to the user in a display window of a computer terminal. Graphic waveform data and operators are selected, by use of, e.g. a mouse, and are symbolically encoded into expressions for viewing in the calculator's display area. Operators may be of the single or multiple operand variety, and may range from simple functions like vector addition or subtraction to more complex logarithmic functions.

A software task executing in the computer contains key "closure" and waveform identifiers from calculator control interface software, and associates the selected key with an assigned vector operator to effect the intended operation on the designated waveform(s). The calculator's display area is updated by an expression display driver to represent symbolically the selected vector expression to be evaluated. The vector data, or graphic waveform(s), that result from the vector calculation may be stored by the user for later viewing or plotting. In the preferred embodiment, the software task, or system, is called by, and returns to, an interactive simulator, such as the Saber TM simulator, available from Analogy, Inc., of Beaverton, Ore.

In the preferred embodiment, the vector data manipulation system, which may be thought of as a software tool, is in a display window that is located on what may be thought of as a desktop. By this invention, the user of an interactive simulator need not type arcane expressions that follow the syntax rules for some command interpreter; the user may now manipulate graphic waveform simulation results as easily and quickly as though using a calculator.

These and other advantages and features of the invention will become more fully apparent when the detailed description below is read with reference to the accompanying drawings.

DESCRIPTION OF THE DRAWINGS

FIG. 1 shows a simplified physical layout of the hardware system on which a calculator implemented in accordance with the present invention might be used.

FIG. 2 shows a block diagram of a software system implemented in accordance with the invention.

DETAILED DESCRIPTION OF THE INVENTION

Figure 3:
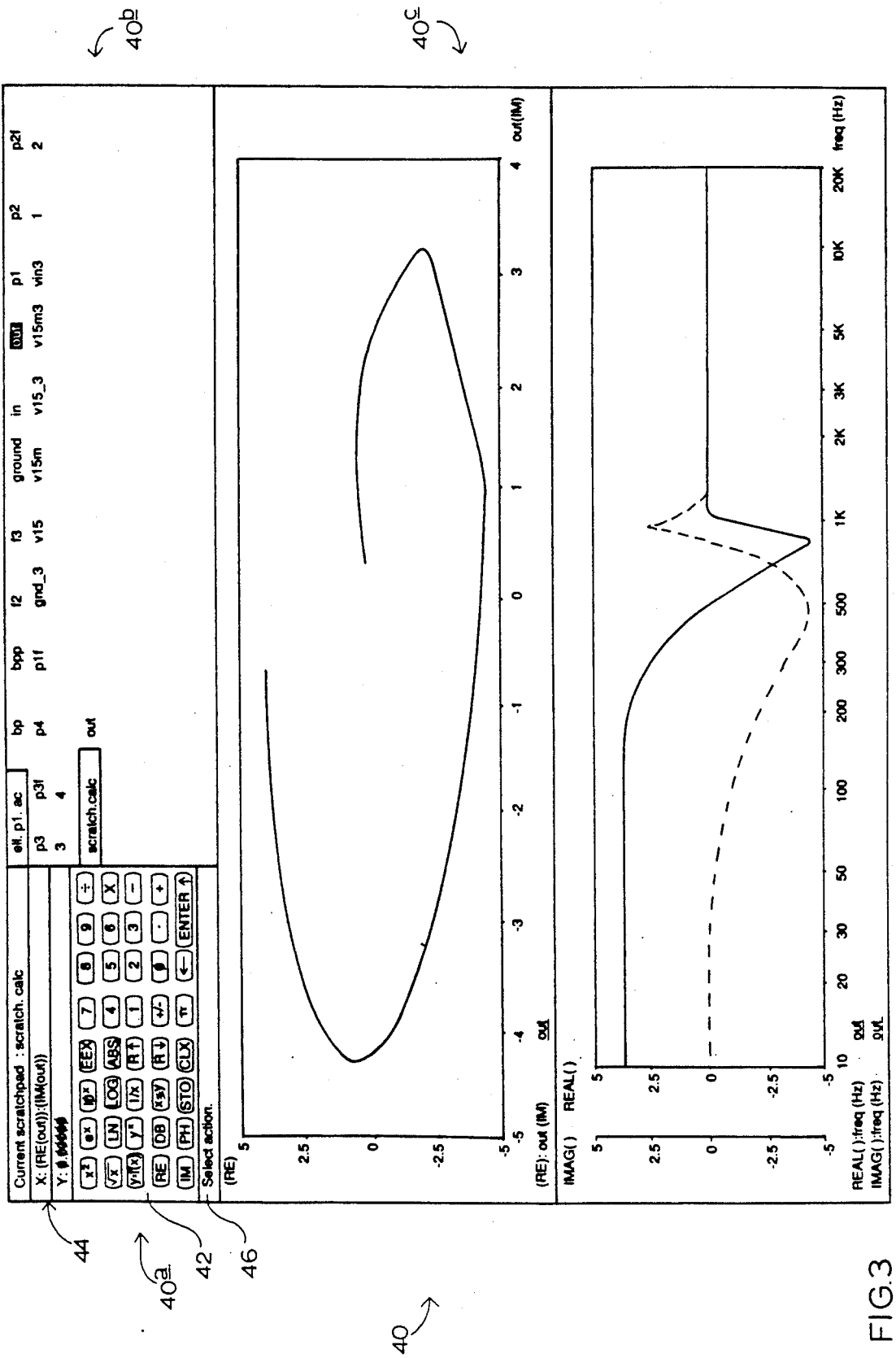
FIG. 3 is an enlarged front elevation of a computer terminal's display monitor, showing the calculator graphics that are produced by the practice of the invention.

Referring first to FIG. 1, a system capable of providing the hardware support needed by the calculator of the present invention is indicated generally at 10. A terminal 12 is shown as including display monitor 12a, keyboard 12b and a cathode ray tube (CRT) display 12c. User-operable, cursor control means, or a mouse 14 equipped with a pushbutton, is shown resting on a work surface beside terminal 12. Mouse 14, which is shown with a single pushbutton, may, of course, have multiple pushbuttons, as in the preferred embodiment of the invention, wherein one pushbutton is used for calculator command entry and the other pushbutton is used to operate pop-up menus. Mouse 14 is connected conventionally by cable 14a to terminal 12. It will be appreciated that user operable means for indicating a cursor location or calculator entry on display 12c may take the form of, e.g. thumbwheels, a joystick, keyboard control keys or a touch panel screen, associated with display 12c.

Shown connected to terminal 12 via cable 16a is a host computer 16. In the preferred embodiment of the invention, computer 16 executes Saber TM simulator software as well as the software that implements the functions of the calculator disclosed herein. By brief reference to FIG. 3, further discussed below, it will be appreciated that, within the spirit of the present invention, the software functions required to implement the calculator may execute on either computer 16 or terminal 12, or, in a partitioned way, on both. Computer 16 may be a multi-user computer, which is capable of supporting more than one terminal. In a conventional system layout, multiple terminals, such as terminal 12, provide file sharing among various users via computer 16 and a disk-based file system (not shown). As used herein, software refers to sequenced instructions or routines that perform a desired function, independent of where such software executes. As will be discussed more fully below, cursor control system 14 permits a user who is stationed in front of terminal 12 to use the calculator implemented in accordance with the present invention by entering commands through keyboard 12b, locating the cursor and indicating a desired position by depressing the pushbutton on mouse 14, and viewing the result of a calculation on display 12c.

Turning now to FIG. 2, a functional block diagram of the calculator is shown. It will be understood that the diagram shows functional blocks and their logical interconnection, and that, in the preferred embodiment, these functions are performed in software. Within the spirit of the invention, these software functions may be hardware-assisted by, e.g. a hardware vector processing unit or a hardware floating point unit. It will also be appreciated that, in the preferred embodiment, the software is written partly in Fortran and partly in C (for purposes of compatibility and portability of various code segments), although other languages may be used. Shown generally at 20 are the calculator's functional blocks and the data and control flow therebetween. Calculator simulator means 20, in cooperation with display 12, simulates the appearance and operation of a calculator keypad which, in operative association with mouse 14, allow the user to apply vector operators to, i.e. to perform vector functions on, selected vector operands. Shown generally at 22, and connected by a stack record bus to calculator simulator means 20, are conventional means of accessing and storing various data files, including both inputs to the calculator and results therefrom.

A calculator control interface 24, consists of structured, linked software routines that (1) create a display window resembling a calculator by depicting a pad of operator keys and an expression subwindow; (2) interpret cursor control inputs ("read" the position of the cursor) to determine the position of the cursor adjacent keys within the calculator display window; (3) push the indicated operands, via control path 24b, onto operand stack 26; (4) control, via path 24a, expression display driver 28; and (5) effect, via path 24c, the processing of vector operands through vector operational unit 30 of vector operands through vector operational unit 30 in accordance with the indicated operator. The essential function of interface 24 is to associate, or linking, the user's selection of keys from keypad 42 (see FIG. 3), via mouse 14 (see FIG. 1), with the vector operators, or application software subroutines that perform the intended vector operations, and to provide means for effecting the same. Interface 24 also enforces the postfix operand entry protocol that is used in interpreting "keystrokes" on keypad 42.

Vector operand manipulation means includes operand stack 26 and vector operational unit 30. Stack 26 is, in the preferred embodiment of the invention, a push down, or last-in/first-out (LIFO), stack that contains vector arrays. These arrays are pushed onto the stack under the control of calculator interface 24, using stack records supplied by file manager 32. Part of the stack record that is supplied by file manager 32 is supplied to encoding means, or expression display driver 28, to provide the symbolically encoded expression in display area 44. The top two vector arrays of operand stack 26 are supplied, one vector at time, to vector operational unit 30 for processing in accordance with the user-selected function key.

The vector output resulting from this processing within vector operational unit 30 is returned to the top of operand stack 26 for further manipulation, if desired, and for presentation over bidirectional stack record bus 33 to file manager 32. In this way, the result of a vector calculation may be stored in disk-based plot files, such as 34a, 34b, 34c, for later viewing or plotting. File manager 32 may be thought of as both controlling access to, and storing, various plot files while providing a scratchpad memory, or buffer 32a between the plot files and operand stack 26. By this use of buffer 32a, disk latency does not delay vector processing. Instead, the user enjoys real-time vector manipulation in response to entry of an operator via the calculator's keypad.

Stack record bus 33 links file manager 32 with plot generation and display software 36 so that those functional features of the calculator that are needed by the interactive simulator (not shown), e.g. plot files 34a, 34b, 34c and file manager 32, may be shared. This allows the vector data (plot file) output of the interactive simulator to be manipulated by the calculator. Thus, calculator control interface 24 cooperates with stack record bus 33 to provide what may be though of as vector data input means. Such vector data input means are for selectively inputting vector data, or vector operands, i.e. operands including both magnitude and directional aspects, to calculator simulator means 20 for manipulation thereby.

Referring finally to FIG. 3, a terminal's display image is illustrated that contains the calculator graphics produced in accordance with the proposed invention. The display, indicated generally at 40, consists of three display fields 40a, 40b, 40c. Calculator display field, or window, 40a contains keypad 42, expression subwindow 44 and message subwindow 46. Signal list display area, or window, 40b contains an array of grouped signal, or vector operand, names from which one or more may be selected for use as operands of the calculator. This window also contains, responsive to the user's selection of the "STO" (store) command from the calculator's keypad, a submenu (not shown) that permits the operator to designate, and thereby to store, for further viewing or plotting, the result of such a calculation. Plot display area, or window, 40c contains waveforms representing selected signal waveforms from the signal list window. By using the cursor control system and display windows 40a, 40b, 40c, the user of the calculator disclosed herein may perform vector manipulations on predefined signal waveforms by (1) selecting a signal waveform from the list and entering it into the X register of the calculator, (2) manipulating the signal waveform by use of the calculator keypad, (3) storing such resulting signal waveform to a scratchpad, and, (4) by use of a mouse and pulldown menus, displaying or plotting the results of such manipulation.

Referring still to FIG. 3, and more particularly to calculator display window 40a, keypad 42, expression subwindow 44 and message subwindow 46 will be described in detail. The plural key, operator-associable calculator keypad of the preferred embodiment includes thirty-nine keys, each containing a label, or legend, describing its function in operation, which operation will be described in further detail below. Table I contains a list of each operator key in keypad 42 and a brief description of its function, or the operator that will be invoked upon "depression" of the corresponding key of keypad 42.

TABLE I

| Legend | Function |
|---|---|
| $x^2$ | raise x to the second power |
| $e^x$ | raise e to the x power |
| $10^x$ | raise 10 to the x power |
| EEX | exponent (raise a constant to a power) |
| 7 | numeric digit 7 |
| 8 | numeric digit 8 |
| 9 | numeric digit 9 |
| ÷ | divide by |
| $\sqrt{x}$ | extract square root of x |
| LN | logarithm (base e) |
| LOG | logarithm (base 10) |
| ABS | absolute value |
| 4 | numeric digit 4 |
| 5 | numeric digit 5 |
| 6 | numeric digit 6 |
| x | multiply by |
| y=f(x) | y as a function of x |
| $y^x$ | raise y to the x power |
| 1/x | invert x |
| R ↑ | pop from stack |
| 1 | numeric digit 1 |
| 2 | numeric digit 2 |
| 3 | numeric digit 3 |
| − | subtract from |
| RE | real component |
| DB | decibels |
| x⇄y | exchange x and y |
| R ↓ | push to stack |
| +/− | change sign (phase) |
| 0 | numeric digit 0 |
| . | decimal point |
| + | add to |
| IM | imaginary component |
| PH | determine phase |
| STO | store x to signal list |
| CLX | clear x |
| π | pi |
| ← | backspace one digit |
| ENTER ↑ | enter operand |

It will be appreciated that other, or additional, functions may be implemented on the calculator's keypad within the spirit of the invention. It will also be appreciated that certain keys may be unassigned, and reserved to being programmed by the user.

Expression subwindow 44 includes, in the preferred embodiment, three lines labeled "Current Scratch Pad," "X:" and "Y:". The fields contain, respectively, the name of the plot file that contains the signal to be stored, the current (symbolic) content of the X register (top of operand stack) and the current (symbolic) content of the Y register. The specific contents of these fields, as shown in FIG. 3, will be explained more fully below by way of an example of the calculator's operation. Expression subwindow 44 uses in-fix notation, rather than the post-fix protocol of the keypad, to represent more clearly the expressions residing in the X and Y registers. Parentheses are used by expression display driver 28 to denote the association within expressions of signal waveforms. These parentheses tell the user in what order evaluation of the expression will occur within vector operation unit 30.

Message subwindow 46 is used by calculator control interface 24 to communicate with the calculator's user. If, for example, the user attempts to divide a scalar quantity by zero, a warning message will appear in message subwindow 46 warning the user that "Illegal data." has been entered. In the preferred embodiment of the invention, this message subwindow is shared by other application software, such as the Saber™ simulator.

Signal list window 40b, as shown in FIG. 3, contains pneumonic identifiers of various signal waveforms ground under the plot file heading "ell.pl.ac." These signal waveforms may be grouped in any desirable manner and associated, disassociated and displayed by conventional means. The list represents those signal waveforms that may be manipulated by the calculator simulator of the present invention, i.e. any may become an argument in an expression to be evaluated by the calculator. In the example illustrated in FIG. 3, one such file name, "out", appears in reverse video format as having been selected by the user for manipulation. The user also has designated a plot file named "scratch.calc" in which to store the results of the manipulation. This is shown, also within the signal list window, directly beneath the array of signal elements grouped under "ell.pl.ac" and similarly is outlined with a rectangular box. If it were desired, in the example described below, that the result of the vector operation performed on the signal waveform called "out" be stored to a disk-based plot file, its destination would be a plot file by the access name of "scratch.calc.out," as designated in this area of the signal list window.

Referring still to FIG. 3, plot window 40c will be understood to be user-selectable to display precalculation or post-calculation signal waveforms, or both. In the example illustrated, the lower portion of this plot window is used to display the signal waveforms that are arguments of expressions to be evaluated by the calculator, and the upper portion thereof is used to display signal waveforms that result from the calculation. Thus, in the example, the dual trace near the bottom of the display (the lower half of plot window 40c) represents the real and imaginary components of a complex signal waveform "out", and the trace near the middle of the display (the upper half of plot window 40c) represents a polar plot of these two complex components, with the real component plotted along the ordinate and the imaginary component plotted along the abscissa.

It will be appreciated that, in the preferred embodiment of the invention, the plot window may have alternate formats. For example, it may be that only the resulting signal waveform is represented, or that the real and imaginary components are separately represented, rather than combined as in the dual scaled graph shown.

OPERATION OF THE CALCULATOR

In operation, the vector calculator is as easy to use as any scientific calculator, with the added benefit that it is accessible via the computer terminal. This will be demonstrated by way of example.

A user's circuit model, which describes an analog filter, has an output represented by the signal waveform "out," which was produced by the interactive simulator. Having completed the interactive simulator run, and now needing to perform further waveform analysis, the user invokes the calculator. The user wishes to view what is known as a polar plot of the filter's response, for the purpose of determining its stability.

First, the user conventionally specifies (as by typing on the terminal's keyboard) plot file "ell.pl.ac," which contains the desired signal waveform "out." The user then selects the desired waveform by positioning the cursor over the "out" entry in the signal list and clicking the mouse, causing "out" to appear in reverse video. Knowing the signal to be of the complex variety, and wishing to analyze a polar plot of its real and imaginary components, the user moves "out" into the X register, by clicking the mouse with the cursor over the X register field of calculator window 40a. The X register field, which displays the current symbolic expression of the operation being performed, now reflects the user's selection "out." The Y register field, which is unaffected by the user's entry, remains zero-filled. Next, the user selects the real component of "out," by selecting the key labeled RE on the keypad. The result is that the X register now contains "RE(out)," and the Y register yet is unchanged. Once again, the user moves "out" into the X register, by clicking within the boundary of the X register subwindow. Once again, the X register contains "out," but now the previous X register contents, "RE(out))," has been pushed onto the Y register. Next, the user selects the imaginary component of "out" by selecting the IM key of the keypad. Now the X register's contents is "IM(out)," and the Y register's contents is "RE(out)." Finally, the user selects the y=f(x) key on the keypad. The result of this final operation is as shown in calculator window 40a of FIG. 3: the X register contains "(RE(out)):(IM(out))," and the Y register is zero-filled as before.

If the polar plot that results from the calculation described above is to be viewed or plotted, it must first be stored. This is accomplished by selecting the STO key, which, in the example given above, stores in the scratchpad, or buffer 32a of FIG. 2, the waveform represented by the expression "(RE(out)):(IM(out))."

It will be appreciated that any signal waveform that has been stored using the calculator may be saved or plotted by using conventional pull-down menus created by well-known programming techniques. In the preferred embodiment of the present invention, such pull-down menus (not shown) are provided in signal list window 40b and allow the user to specify the display and plotting axes on which the signal waveform will be displayed or plotted. In the case of signal waveforms that represent multiple dependent variables as a function of a single independent variable, such as time or frequency, multiple waveforms may be superimposed on a single set of axes. Thus, by conventional user interface techniques, signal waveforms that have been stored using the calculator may be viewed in plot window 40c, as shown in FIG. 3.

The advantages offered by the invention should be apparent to those skilled in the art. By providing a "soft" calculator window on a computer terminal's display, the present invention enables a user to manipulate vector data representing graphic waveforms in a variety of useful ways without the tedious and arcane typing of commands in accordance with special syntax rules. Instead, by clicking the mouse a few times, the user may manipulate vector data with the same facility that scalar data previously has been manipulated using scientific calculators. Importantly, the vector calculator is available at the touch of a button, so that the user may readily access it via the terminal at which other design work is performed.

The invention has been described, in its preferred embodiment, as it might be employed in analog circuit design and analysis. It will be appreciated that the calculator is adaptable, within the spirit of the invention, to other disciplines that require the use of a computer terminal, e.g. electromagnetic, thermodynamic or kinetic system design and analysis.

Accordingly, while a preferred embodiment of the invention has been describe herein, it is appreciated that further modifications are possible that come within the scope of the invention.

It is claimed and desired to secure by letters patent:

1. A vector data manipulation system, for use in conjunction with a computer terminal having a display monitor with a cursor, and a cursor control device with a push button, comprising:
   means for depicting a pad of plural vector operator keys for display on such monitor;
   means, responsive to such cursor control device, for positioning such cursor within the display on the monitor and adjacent one of said keys to select one of said vector operators;
   means, responsive to such push button, for reading the position of such cursor to determine which vector operators is selected;
   means, responsive to such cursor control device and such push button, for determining which vector data are selected as vector operands;
   means for manipulating such vector operands in accordance with such selected vector operator to produce a graphic waveform; and
   means for displaying said graphic waveform on a monitor.

2. The system of claim 1, wherein said pad-depicting means includes means for creating a display, and encoding means for representing symbolically on said display selected vector operands.

3. The system of claim 2, wherein said pad-depicting means employs an operand stack.

4. The system of claim 3, wherein said stack, as employed by said pad-depicting means, handles operands ordered in accordance with a last-in/first-out protocol.

5. The system of claim 1, wherein said keys are each labeled with at least one operator.

6. The system of claim 5, wherein such operators include single operand, time-based functions.

7. In the field of user interfaces to a computer terminal having a display monitor, and to application software including user-selectable vector functions for processing user-selectable graphic waveform data to perform a desired vector operand manipulation thereon, the data including at least one vector operand, a vector data manipulation system comprising:
   calculator simulator means for simulating the appearance and operation of a calculator having a plural key keypad, at least one of the keys being associable with at least one vector function;
   means for selecting a graphic waveform represented by plural ordered vectors;
   means associating at least one vector function with a corresponding one of the keys of said keypad; and
   user-operable cursor control means for operating said keys, whereby user operation of one or more of said keys results in the selection of one or more of such functions thereby processing such plural ordered vectors which represent such selected graphic waveform to produce a different graphic waveform.

8. A vector calculator emulation comprising:
   calculator simulator means including a display for simulating the appearance and operation of a calculator having a plural key keypad;
   cursor control means operatively connected with the display;
   means for selecting a graphic waveform represented by a first ordered sequence of vectors as an operand in a vector calculator operation;
   user-operable means associated with said cursor control means and said keys for effecting sequential vector operations on such selected graphic waveform to produce a second ordered sequence of vectors representing a different graphic waveform.

9. The system of claims 1, 7, or 8, wherein at least one of said keys in user-programmable.

10. A graphic waveform calculator emulation comprising:
    calculator simulator means including a display for simulating the appearance and operation of a calculator having a plural key keypad;
    cursor control means operatively connected with the display for operating the keypad;
    means for inputting a graphic waveform represented by plural vectors as an operand in a calculator operation;
    means associated with said cursor control means and said keys for selecting a plural-vector operation to be performed by said calculator simulator means;
    processing such operand in accordance with such selected plural-vector operation to produce a different graphic waveform; and
    means associated with said operand-processing means and said keys for displaying said different graphic waveform.

* * * * *